United States Patent
Uchino et al.

(10) Patent No.: US 9,320,056 B2
(45) Date of Patent: Apr. 19, 2016

(54) MOBILE STATION AND RADIO BASE STATION FOR "ALWAYS-ON" METHOD

(71) Applicant: NTT DOCOMO, INC., Tokyo (JP)

(72) Inventors: Tooru Uchino, Tokyo (JP); Wuri Andarmawanti Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/418,219

(22) PCT Filed: Jul. 17, 2013

(86) PCT No.: PCT/JP2013/069410
§ 371 (c)(1),
(2) Date: Jan. 29, 2015

(87) PCT Pub. No.: WO2014/021104
PCT Pub. Date: Feb. 6, 2014

(65) Prior Publication Data
US 2015/0264712 A1    Sep. 17, 2015

(30) Foreign Application Priority Data
Jul. 31, 2012   (JP) .................................. 2012-169922

(51) Int. Cl.
*H04W 72/00*   (2009.01)
*H04W 4/00*    (2009.01)
(Continued)

(52) U.S. Cl.
CPC ................. *H04W 74/04* (2013.01); *H04L 1/00* (2013.01); *H04W 74/08* (2013.01); *H04W 76/046* (2013.01); *H04W 72/1284* (2013.01)

(58) Field of Classification Search
None
See application file for complete search history.

(56) References Cited

U.S. PATENT DOCUMENTS

| 2010/0254340 A1* | 10/2010 | Park .......................... H04L 5/00 370/329 |
| 2011/0092240 A1 | 4/2011 | Aiba et al. |

(Continued)

FOREIGN PATENT DOCUMENTS

| EP | 2469954 A1 | 6/2012 |
| JP | 2010-539783 A | 12/2010 |

(Continued)

OTHER PUBLICATIONS

3GPP TS 36.321 V10.5.0; "3rd Generation Partnership Project; Technical Specification Group Radio Access Network; Evolved Universal Terrestrial Radio Access (E-UTRA); Medium Access Control (MAC) protocol specification (Release 10);" Mar. 2012 (54 pages).

(Continued)

*Primary Examiner* — Erika A Washington
(74) *Attorney, Agent, or Firm* — Osha Liang LLP (57) ABSTRACT

When an "always-on" method is applied, a situation of a shortage in resources for transmitting a SR is avoided while avoiding a delay in transmission of an uplink data signal or a drop in use efficiency of resources. A mobile station (UE) of the invention includes a transmission unit (23) configured, when resources for a collision-type SR to be shared with a different mobile station (UE) are set up, to transmit a collision-type SR including an identifier of the mobile station (UE) by using the resources for a collision-type SR. When no resources for an uplink data signal are allocated for the collision-type SR, the transmission unit (23) is configured to retransmit the collision-type SR by using the resources for a collision-type SR.

6 Claims, 11 Drawing Sheets

(51) Int. Cl.
*H04W 74/04* (2009.01)
*H04W 74/08* (2009.01)
*H04L 1/00* (2006.01)
*H04W 76/04* (2009.01)
*H04W 72/12* (2009.01)

(56) References Cited

U.S. PATENT DOCUMENTS

2011/0268028 A1* 11/2011 Stern-Berkowitz . H04L 27/2613
370/328
2011/0321050 A1* 12/2011 Ho ......................... H04W 4/08
718/102

FOREIGN PATENT DOCUMENTS

| WO | 2009/035301 A2 | 3/2009 |
|---|---|---|
| WO | 2009/128285 A1 | 10/2009 |
| WO | 2010/057540 A1 | 5/2010 |
| WO | 2011/082110 A1 | 7/2011 |

OTHER PUBLICATIONS

International Search Report for corresponding International Application No. PCT/JP2013/069410, mailed Sep. 17, 2013 (2 pages).
Written Opinion for corresponding International Application No. PCT/JP2013/069410, mailed Sep. 17, 2013 (4 pages).
Extended European Search Report issued in the counterpart European Patent Application No.: 13825915.5, mailed Mar. 4, 2016 (10 pages).
Ericsson et al; "Details of latency reduction alternatives"; 3GPP TSG-RAN WG2 #69, R2-101332; San Fransisco, USA; Feb. 22-26, 2010 (2 pages).

* cited by examiner

MOBILE STATION AND RADIO BASE STATION FOR "ALWAYS-ON" METHOD

TECHNICAL FIELD

The present invention relates to a mobile station and a radio base station.

BACKGROUND ART

Figure 6:
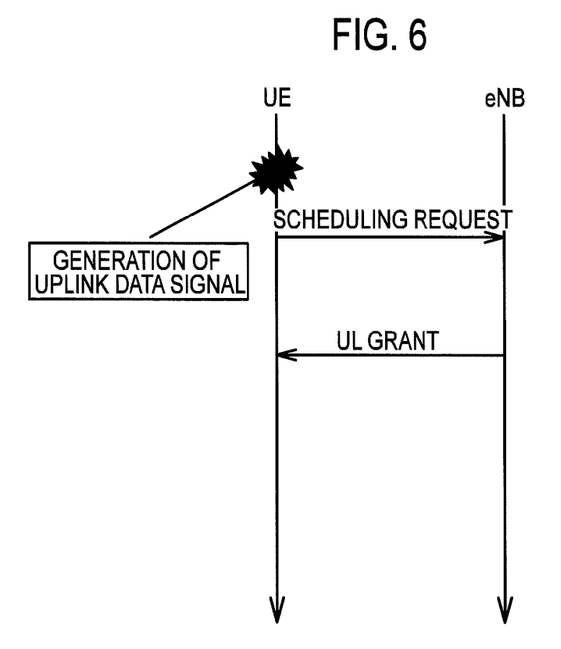
FIG. 6 is a diagram for explaining the related art.
Figure 7:
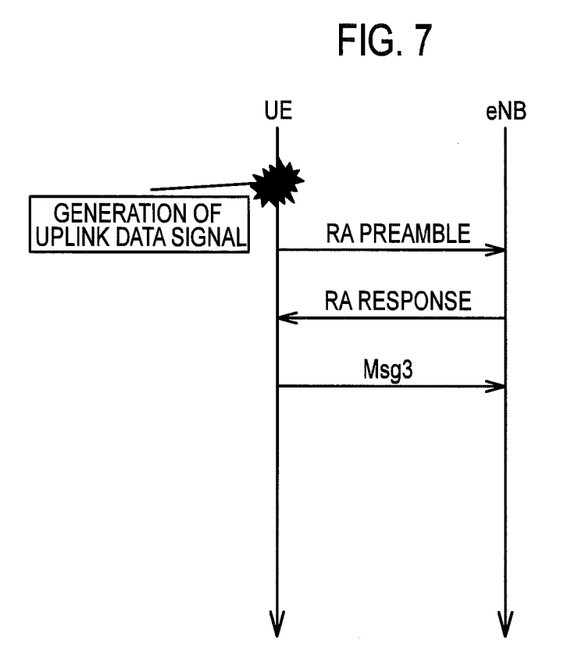
FIG. 7 is a diagram for explaining the related art.

In LTE (Long Term Evolution), when transmission of an uplink data signal is desired, a mobile station UE is configured to adopt any one of methods of: transmitting an SR (scheduling request signal) by using setup resources for an individual SR dedicated for the mobile station UE as shown in FIG. 6; and transmitting the SR by using an "RA (random access) procedure" as shown in FIG. 7.

Figure 8:
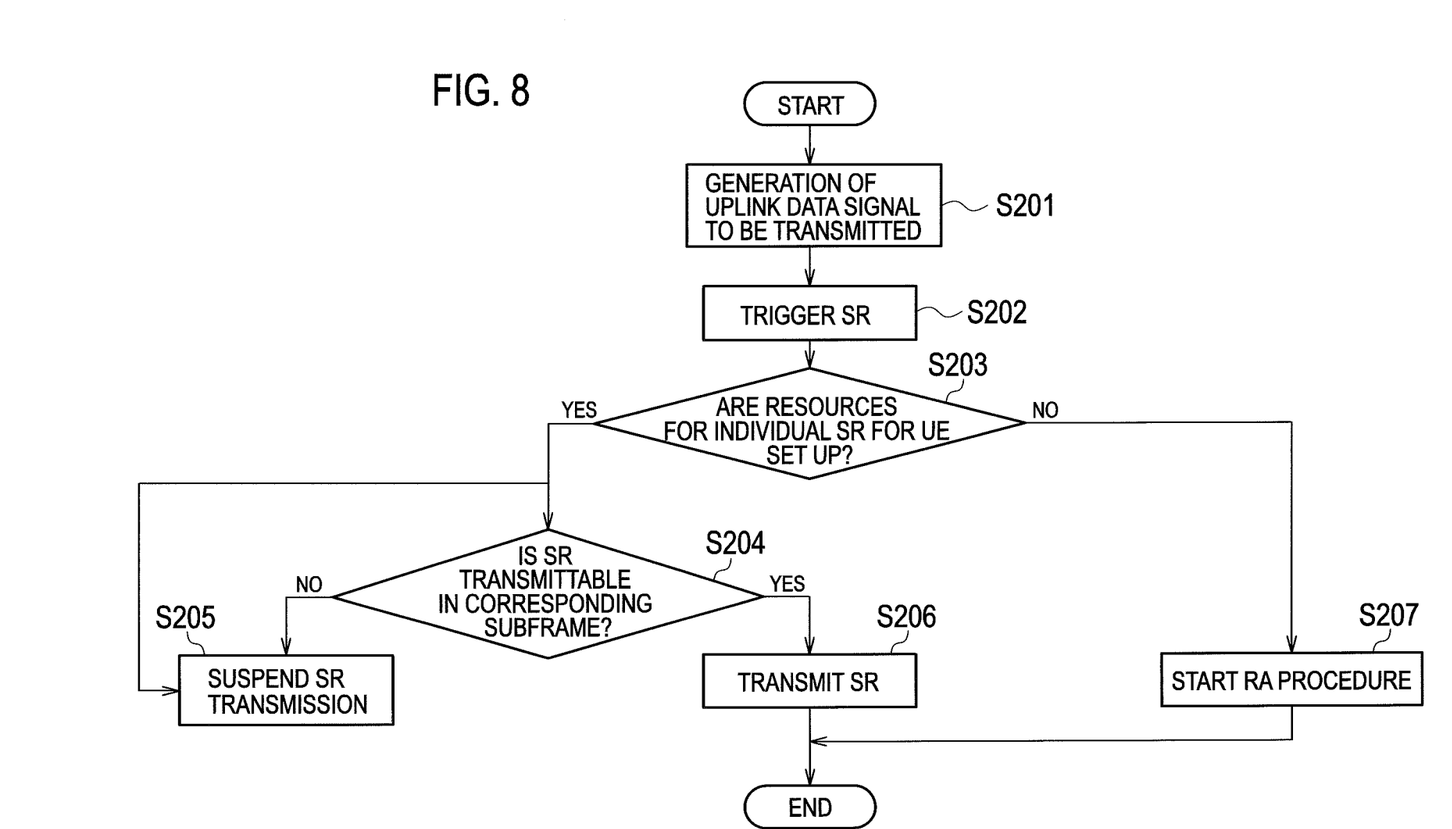
FIG. 8 is a diagram for explaining the related art.

Specifically, as shown in FIG. 8, when the mobile station UE detects generation of an uplink data signal to be transmitted in step S201, the mobile station UE determines that the SR is supposed to be transmitted in step S202, and determines whether or not the resources for an individual SR dedicated for the mobile station UE are set up in step S203.

If "yes," the operation proceeds to step S204. If "no," the operation proceeds to step S207.

In step S204, the mobile station UE determines whether or not it is possible to transmit the SR in the most recent subframe corresponding to the resources for an individual SR.

If "yes," the operation proceeds to step S206. If "no," the operation proceeds to step S205.

In step S205, the mobile station UE suspends the transmission of the SR in the subframe, and the operation returns to step S204.

In step S206, the mobile station UE transmits the SR in the subframe by using the resources for an individual SR.

In step S207, the mobile station UE transmits the SR by using the "RA procedure" (see FIG. 7).

Meanwhile, in LTE, the mobile station UE may adopt two states, namely, an "IDLE state" and an "RRC_Connected state."

The "IDLE state" is a state where connection between networks (a core network and a radio access network) and the mobile station UE is not established (where individual resources for the mobile station UE are not set up either). The mobile station UE in the "IDLE state" first has to transition to the "RRC_Connected state" in order to start transmission and reception of data signals.

On the other hand, the "RRC_Connected state" is a state where the connection between the networks and the mobile station US is established. The mobile station UE in the "RRC_Connected state" can perform transmission and reception of data signals.

Generally, it is preferable that the mobile station UE not having any data signals to be transmitted or received transition to the "IDLE state" from the viewpoint of effective use of its battery and radio resources.

Figure 9:
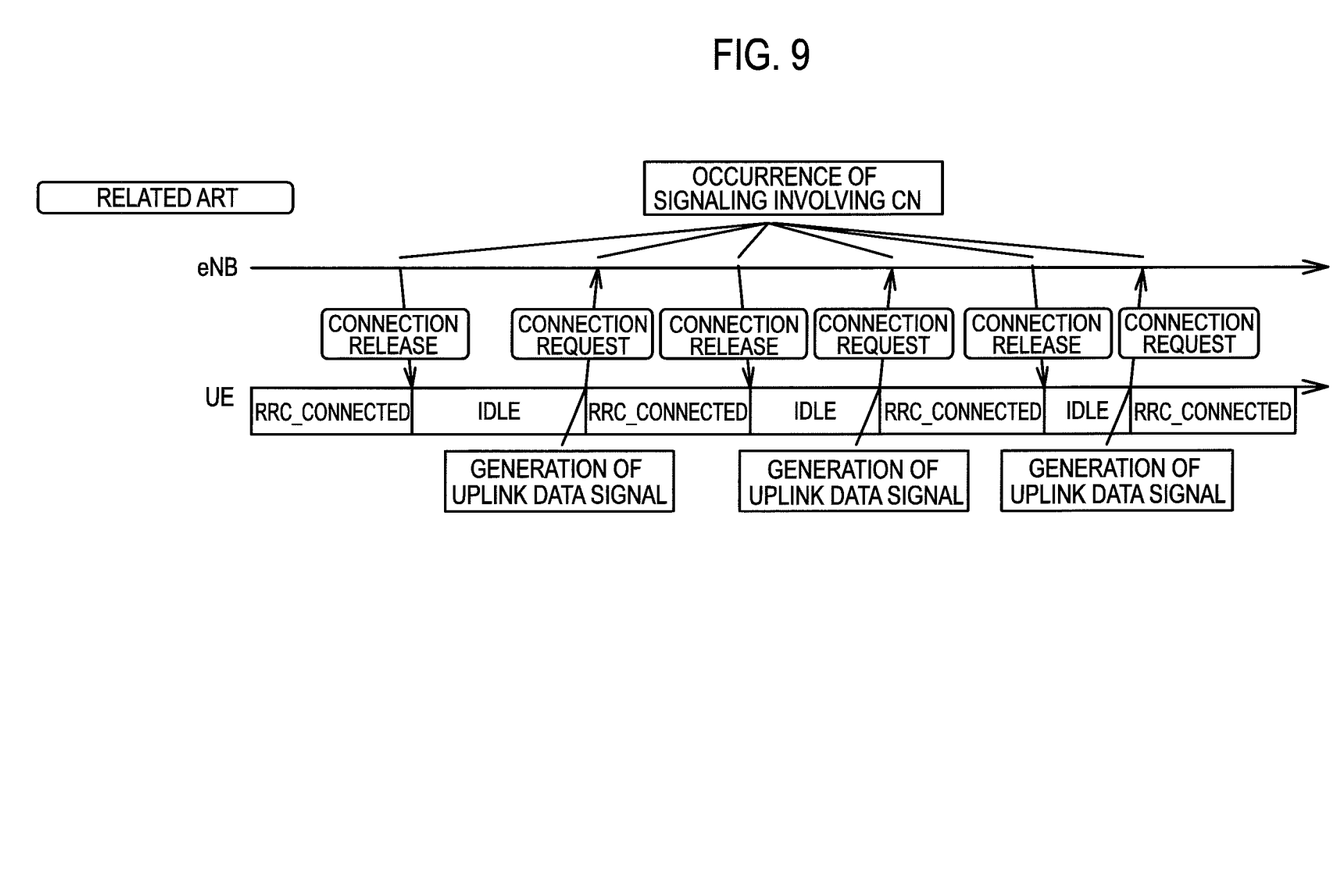
FIG. 9 is a diagram for explaining the related art.

In the meantime, an occurrence frequency of intermittent data such as background traffics is increased nowadays due to diffusion of smartphones and tablet terminals. Such an increase causes frequent occurrence of transitions between the "IDLE state" and the "RRC_Connected state" as shown in FIG. 9, and leads to a problem of an increase in signaling load on the core network (CN).

Figure 10:
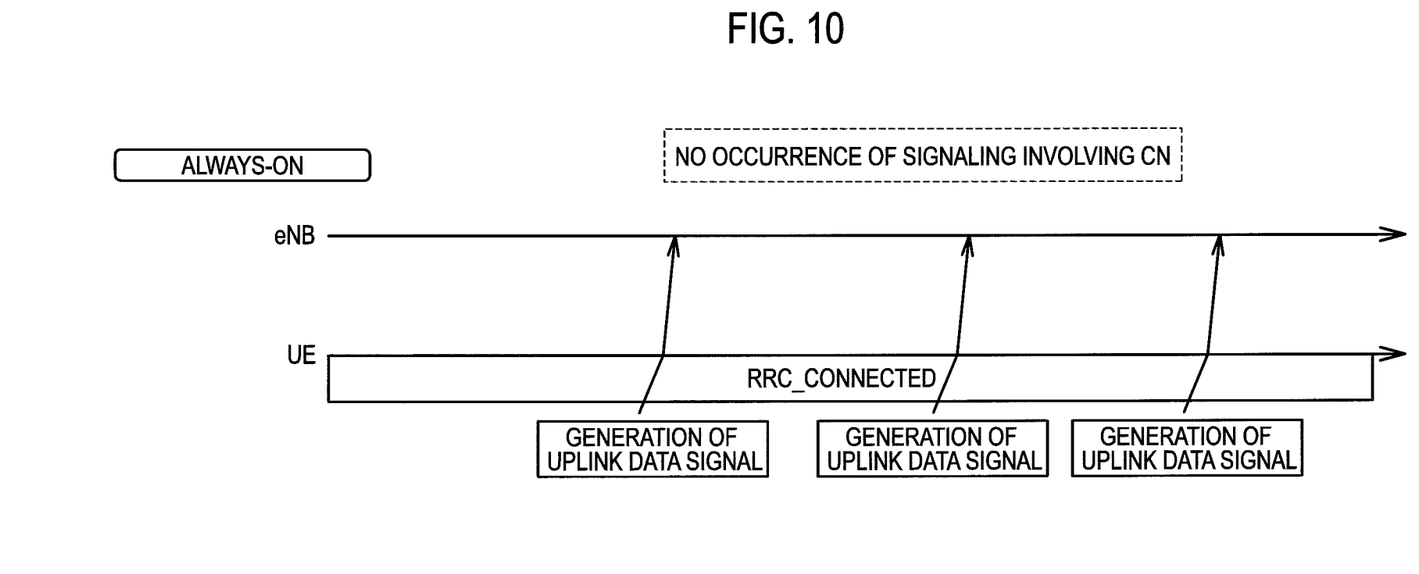
FIG. 10 is a diagram for explaining the related art.

Hence, a control method called an "always-on" method to keep the mobile station UE always in the "RRC_Connected state" is being studied (see FIG. 10). As shown in FIG. 10, the "always-on" method can suppress signaling involving the core network (CN) in association with the transitions of the mobile station UE between the "RRC_Connected state" and the "IDLE state."

A problem of the "always-on" method is a potential shortage in individual resources to be allocated to each mobile station UE as a result of an increase in the number of mobile stations UE which are in the "RRC_Connected state" at the same time.

Here, the individual resources are thought to include "resources for a periodic SRS (sounding reference signal)," "resources for a PUCCH (physical uplink control channel)-CQI (channel quality indicator)," "resources for a PUCCH-SR (the resources for an individual SR)," and the like.

The "resources for a periodic SRS" are resources used by the mobile station UE for periodically transmitting an SRS used for AMC (adaptive modulation and coding) and the like of the mobile station UE.

Meanwhile, the "resources for a PUCCH-CQI" are resources used by the mobile station UE for periodically transmitting a CQI used for the AMC and the like of the mobile station UE.

The "resources for a PUCCH-SR" are resources used by the mobile station UE for transmitting the SR.

A method including extending a cycle to allocate the individual resources (a first method), a method including increasing the number of mobile stations UE to be multiplexed in one subframe (a second method), and the like are generally thought of as methods to solve the above-described problem of the "always-on" method.

PRIOR ART DOCUMENT

Non-Patent Document

Non-patent document 1: 3GPP TS36.321.

SUMMARY OF THE INVENTION

Here, the first method and the second method described above can solve the problem of the "always-on" method regarding the "resources for a periodic SRS" and the "resources for a PUCCH-CQI." However, the first method and the second method raise the following concerns regarding the "resources for a PUCCH-SR."

Figure 11:
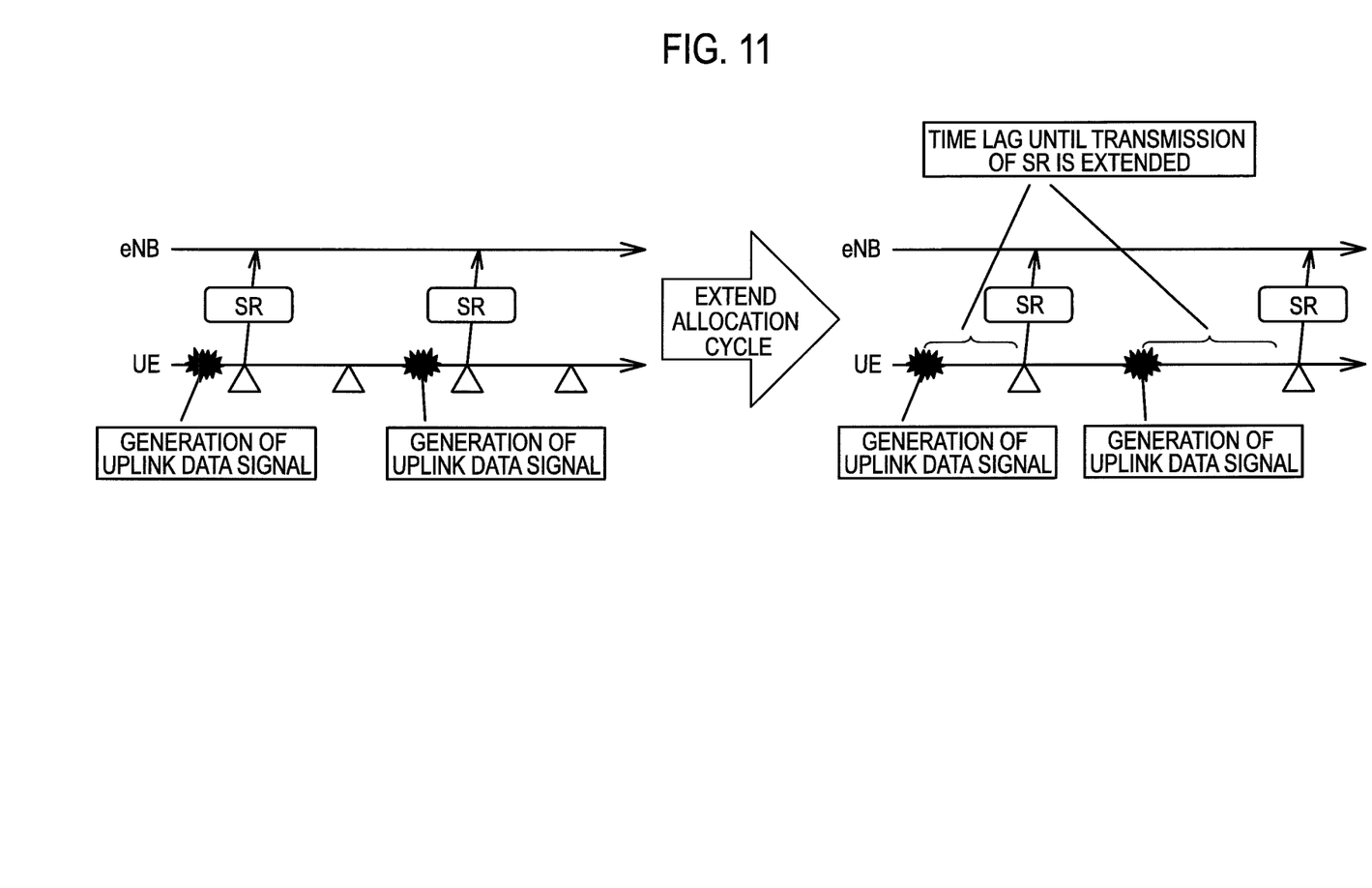
FIG. 11 is a diagram for explaining the related art.

As shown in FIG. 11, when the first method is used, there is a problem that a time lag at the mobile station UE between a point of generation of the uplink data signal to be transmitted and a point of transmission of the SR is extended, and such extension leads to a delay in transmission of the uplink data signal.

Figure 12:
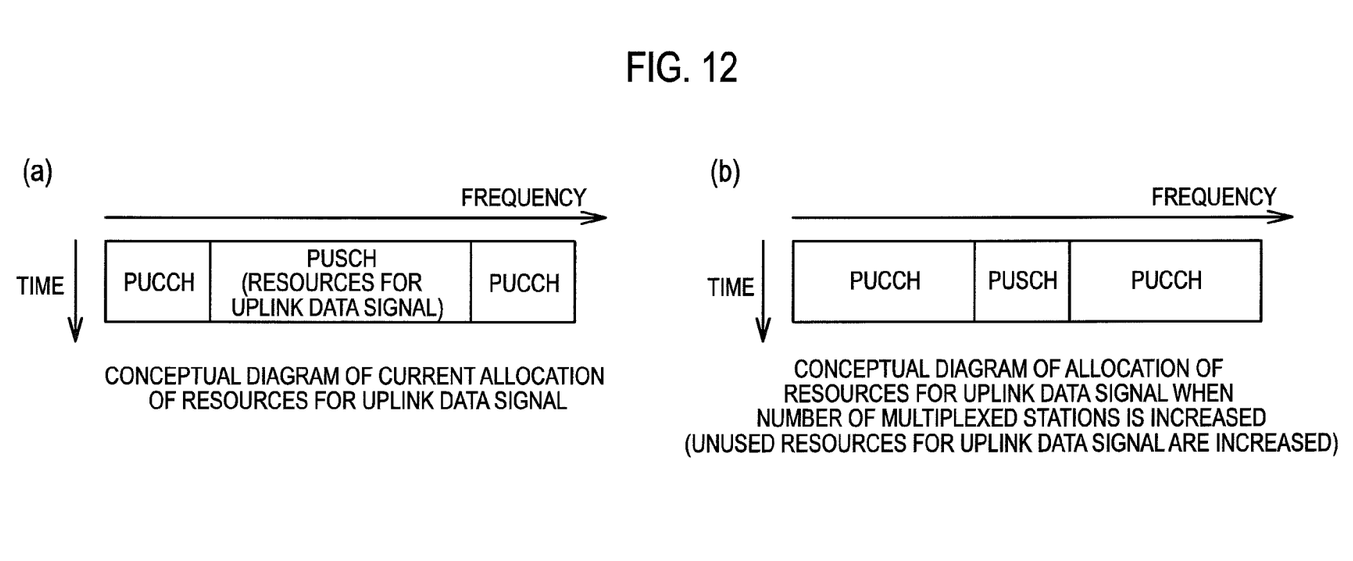
FIG. 12 shows diagrams for explaining the related art.

Meanwhile, as shown in FIG. 12 (a) and FIG. 12 (b), when the second method is used, there is a problem of a drop in use efficiency of resources because resources for the uplink data signal, i.e., resources that can be used as a PUSCH (physical uplink shared channel) are reduced on the one hand, while an amount of secured resources that are not always used, such as the resources for transmitting the SR, is increased on the other hand.

The present invention is made in view of the aforementioned problems. An objective of the present invention is to provide a mobile station and a radio base station, which are capable of avoiding a situation of a shortage in resources for transmitting an SR while avoiding a delay in transmission of an uplink data signal or a drop in use efficiency of resources when the "always-on" method is applied.

A first feature of the embodiment is summarized as a mobile station including a transmission unit configured, when resources for a collision-type scheduling request signal to be shared with a different mobile station are set up, to transmit a collision-type scheduling request signal including an identifier of the mobile station by using the resources for a collision-type scheduling request signal. Here, when no resources for an uplink data signal are allocated in response to the collision-type scheduling request signal, the transmission unit is configured to retransmit the collision-type scheduling request signal by using the resources for a collision-type scheduling request signal.

A second feature of the embodiment is summarized as a radio base station including a transmission unit configured to notify each of a plurality of mobile stations, which are subjected to grouping, of resources for a collision-type scheduling request signal to be shared by the plurality of mobile stations.

MODE FOR CARRYING OUT THE INVENTION (Mobile Communication System According to First Embodiment of Present Invention)

A mobile communication system according to a first embodiment of the present invention will be described with reference to FIG. 1 to FIG. 5.

An LTE mobile communication system is described as an example in the embodiment. However, the present invention is not limited only to such a mobile communication system, but are also applicable to mobile communication systems of other modes.

Figure 1:
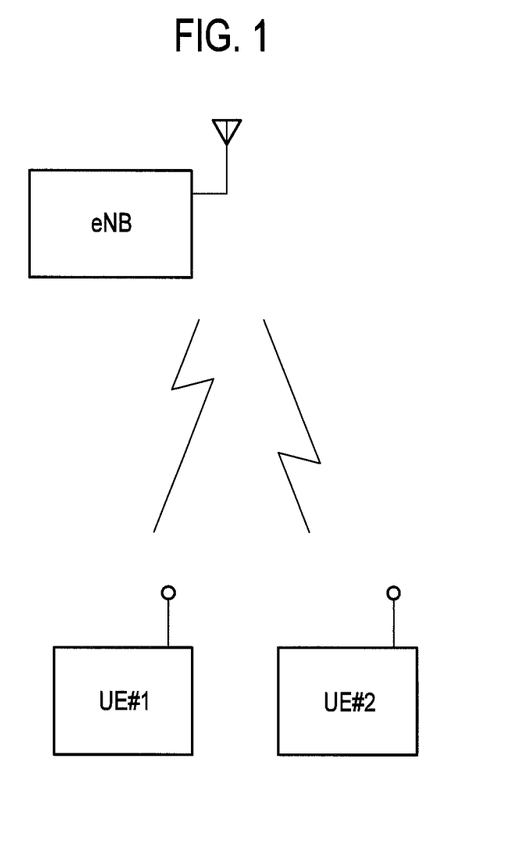
FIG. 1 is an overall configuration diagram of a mobile communication system according to a first embodiment of the present invention.

As shown in FIG. 1, a mobile communication system of the embodiment includes a radio base station eNB and multiple mobile stations UE (such as mobile stations UE#1/#2).

Figure 2:
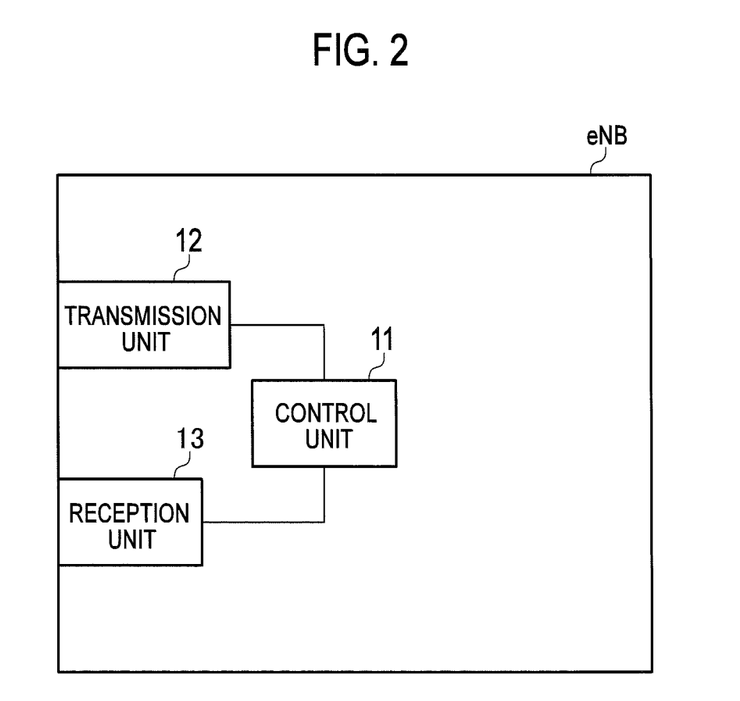
FIG. 2 is a functional block diagram of a radio base station according to the first embodiment of the present invention.

As shown in FIG. 2, the radio base station eNB includes a control unit 11, a transmission unit 12, and a reception unit 13.

The control unit 11 is configured to perform entire control processing in the radio base station eNB.

Specifically, the control unit 11 may be configured to determine (i.e., perform grouping of) mobile stations UE among multiple mobiles stations UE, such that the determined mobile stations UE are assigned to a group to which the same resources for a collision-type SR are allocated.

Here, the control unit 11 may be: configured to perform the above-described grouping on the basis of radio quality factors of the multiple mobile stations UE in an uplink; configured to perform the above-described grouping on the basis of whether or not each of the multiple mobile stations UE is a priority terminal; configured to perform the above-described grouping on the basis of terminal types (as to whether or not each mobile station UE is a machine-type terminal, and the like); configured to perform the above-described grouping on the basis of service types (such as a voice, "best effort", and the like); and configured to perform the above-described grouping on the basis of data transmission and reception conditions and battery condition of the mobile stations UE.

For example, when the resources for a collision-type SR have a cycle of 100 ms and 100 mobile stations UE are present, the control unit 11 may be configured to cause every ten mobile stations UE to share the same resources for a collision-type SR.

In this case, the control unit 11 may be configured to assign mobile stations UE#0 to UE#9 to a group #0 to which an SR subframe #0 is allocated as the resources for a collision-type SR; to assign mobile stations UE#10 to UE#19 to a group #1 to which an SR subframe #1 is allocated as the resources for a collision-type SR; to assign mobile stations UE#20 to UE#29 to a group #2 to which an SR subframe #2 is allocated as the resources for a collision-type SR; to assign mobile stations UE#30 to UE#39 to a group #3 to which an SR subframe #3 is allocated as the resources for a collision-type SR; to assign mobile stations UE#40 to UE#49 to a group #4 to which an SR subframe #4 is allocated as the resources for a collision-type SR; to assign mobile stations UE#50 to UE#59 to a group #5 to which an SR subframe #5 is allocated as the resources for a collision-type SR; to assign mobile stations UE#60 to UE#69 to a group #6 to which an SR subframe #6 is allocated as the resources for a collision-type SR; to assign mobile stations UE#70 to UE#79 to a group #7 to which an SR subframe #7 is allocated as the resources for a collision-type SR; to assign mobile stations UE#80 to UE#89 to a group #8 to which an SR subframe #8 is allocated as the resources for a collision-type SR; and to assign mobile stations UE#90 to UE#99 to a group #9 to which an SR subframe #9 is allocated as the resources for a collision-type SR.

According to this configuration, the multiple mobile stations UE can share the resources for transmitting the SR. Thus, it is possible to avoid a situation in which the required resources for transmitting the SR are increased linearly with respect to the number of the mobile stations UE in the "RRC_Connected state."

The transmission unit 12 is configured to transmit various signals to the multiple mobile stations UE. The reception unit 13 is configured to receive various signals from the multiple mobile stations UE.

Specifically, the transmission unit 12 may be configured to notify each of the multiple mobile stations UE, which are determined to be assigned to the same group by the control unit 11, of the resources for a collision-type SR used in the group.

Here, the resources for a collision-type SR are resources shared by the multiple mobile stations UE assigned to a specific group.

Note that the transmission unit 12 may be configured to notify of the resources for a collision-type SR in the form of "RRC connection reconfiguration," for example, by using an RRC (radio resource control) layer, or configured to notify of the resources for a collision-type SR by using an RLC (radio link control) layer, a MAC (media access control) layer or a physical layer.

Meanwhile, the transmission unit 12 may be configured to notify each of the multiple mobile stations UE of the resources for an individual SR dedicated for each mobile station UE, together with the resources for a collision-type SR.

Instead, the transmission unit 12 may be configured to notify each of the multiple mobile stations UE of only one of the resources for a collision-type SR and the resources for an individual SR dedicated for each mobile station UE.

Instead, the transmission unit 12 may be configured to notify a mobile station UE, in which no uplink data signals (U-plane data) to be transmitted have been generated for a predetermined time period, of the resources for a collision-type SR, and to notify any other mobile stations UE of the resources for an individual SR dedicated for the respective mobile stations UE.

Figure 3:
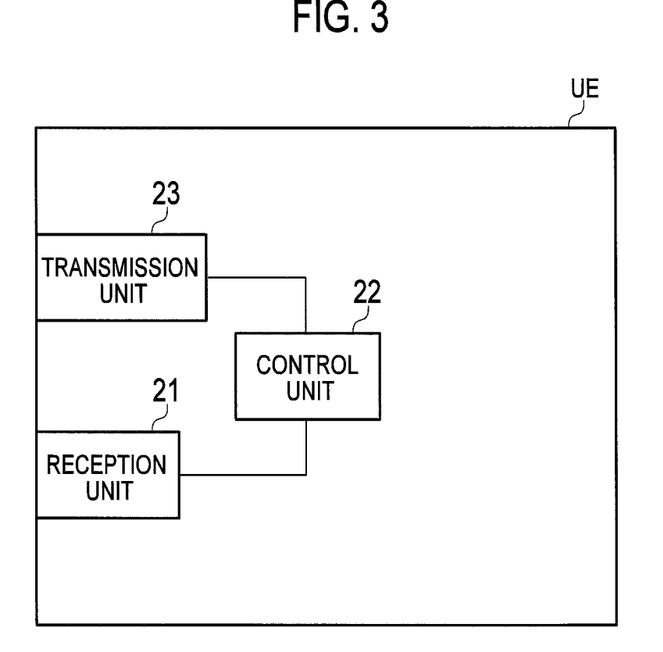
FIG. 3 is a functional block diagram of a mobile station according to the first embodiment of the present invention.

As shown in FIG. 3, the mobile station UE includes a reception unit 21, a control unit 22, and a transmission unit 23. The multiple mobile stations UE#1/UE#2 basically have the same configuration, which will therefore be described below as the configuration of the mobile station UE.

The reception unit 21 is configured to receive various signals from the radio base station eNB. The control unit 22 is configured to perform entire control processing in the mobile station UE. The transmission unit 23 is configured to transmit various signals to the radio base station eNB.

Here, the reception unit 21 is configured to acquire the resources for a collision-type SR and the resources for an individual SR from the radio base station eNB.

In the case of generation of an uplink data signal to be transmitted, the control unit 22 is configured to determine whether or not the resources for an individual SR dedicated for the mobile station UE are set up, and to determine whether or not the resources for a collision-type SR are set up.

Note that the control unit 22 may be configured to determine whether or not the resources for a collision-type SR are set up only when the control unit 22 determines that the resources for an individual SR are not set up.

Here, the cases where the resources for an individual SR are not set up are thought to include: a case where "initial access" is performed by the mobile station UE; a case where reconnection processing is performed by the mobile station UE; a case where the resources for an individual SR are autonomously released by the mobile station UE because a "TA (timing advance) timer" is expired; a case where the resources for an individual SR are autonomously released by the mobile station UE because the SR of the maximum number of retransmissions are retransmitted; a case where no resources for an individual SR are allocated by a network; and so forth.

Note that the control unit 22 may be configured not to release the resources for a collision-type SR autonomously when the "TA timer" is expired, or when the number of times of retransmission of a collision-type SR exceeds the maximum number of retransmissions, for example.

In this case, if the resources for a collision-type SR and the resources for an individual SR are both set up, the control unit 22 may be configured to release the resources for an individual SR.

Meanwhile, when the number of times of retransmission (the number of times of transmission) of the collision-type SR exceeds the maximum number of retransmissions, the control unit 22 may be configured to start the RA procedure, configured to transmit the collision-type SR after a lapse of a predetermined time period, or configured to start a reconnection procedure by detecting a defect in the connectivity to the radio base station eNB.

When the resources for a collision-type SR are set up, the transmission unit 23 is configured to transmit a collision-type SR including an identifier of the mobile station UE by using the resources for a collision-type SR.

Here, the identifier of the mobile station UE may be expressly indicated by the radio base station eNB or may be autonomously calculated by the mobile station UE (for example, by using information such as the identifier of the mobile station UE in a cell).

Note that the transmission unit 23 may be configured to transmit an SR not including the identifier of the mobile station UE by using the resources for an individual SR when the resources for a collision-type SR and the resources for an individual SR are both set up.

Alternatively, when the resources for a collision-type SR and the resources for an individual SR are both set up, the transmission unit 23 may be configured to determine which of the resources for a collision-type SR and the resources for an individual SR are supposed to be used on the basis of the type of the uplink data signal to be transmitted (or of the service type), and the like.

For example, when the uplink data signal to be transmitted is a voice communication signal, the transmission unit 23 may be configured to use the resources for an individual SR. Meanwhile, when the uplink data signal to be transmitted is a data transmission signal, the transmission unit 23 may be configured to use the resources for a collision-type SR.

An operation of the mobile station UE of the embodiment will be described below with reference to FIG. 4 and FIG. 5.

Figure 4:
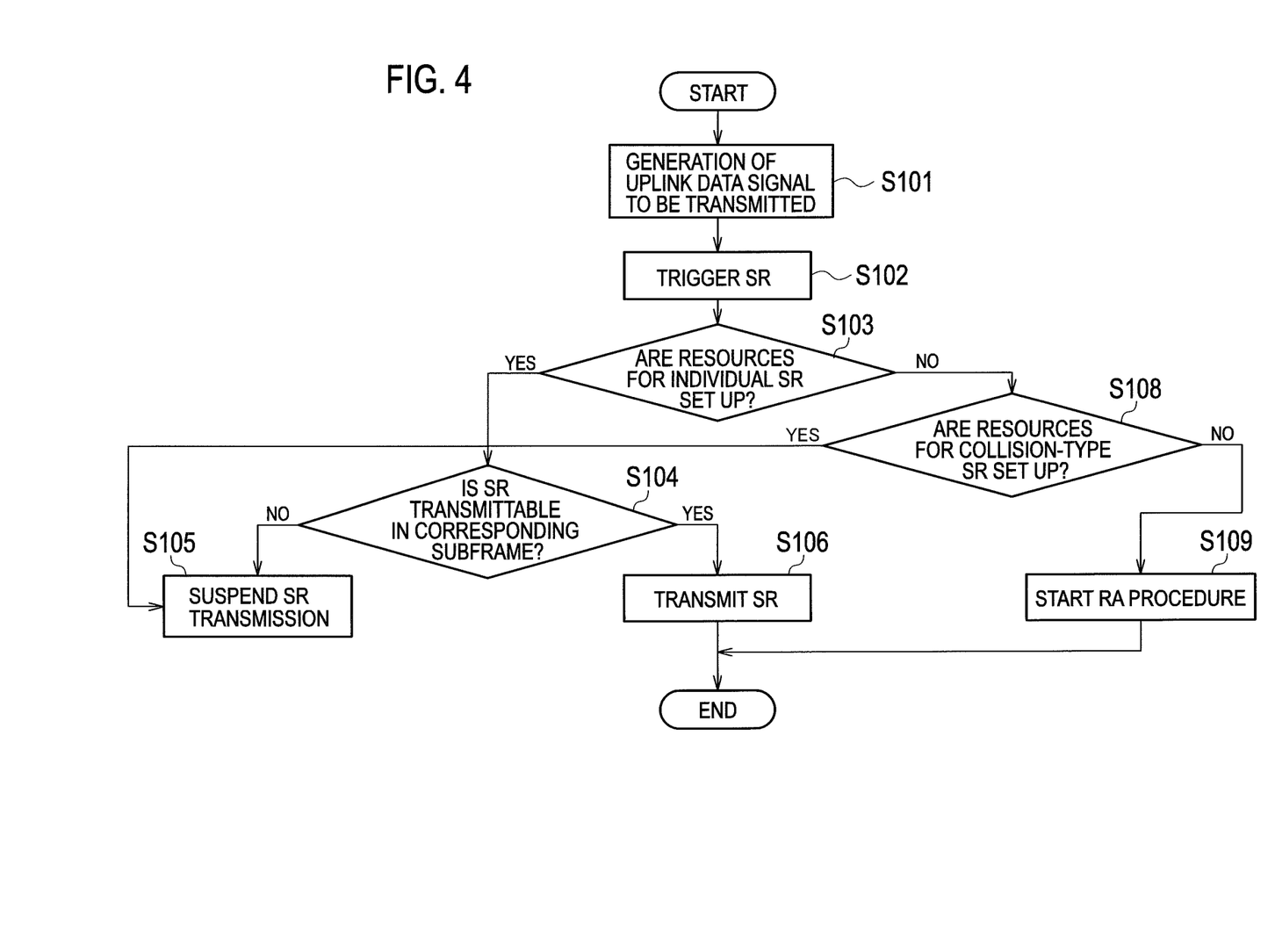
FIG. 4 is a flowchart showing an operation of the mobile station according to the first embodiment of the present invention.

As shown in FIG. 4, when the mobile station UE detects the uplink data signal to be transmitted in step S101, the mobile station UE determines that the SR is supposed to be transmitted in step S102, and determines whether or not the resources for an individual SR dedicated for the mobile station UE are set up in step S103.

If "yes," the operation proceeds to step S104. If "no," the operation proceeds to step S108.

In step S104, the mobile station UE determines whether or not it is possible to transmit the SR in the most recent subframe corresponding to the resources for an individual SR.

If "yes," the operation proceeds to step S106. If "no," the operation proceeds to step S105.

In step S105, the mobile station UE suspends the transmission of the SR in the subframe, and the operation returns to step S104.

In step S106, the mobile station UE transmits the SR in the subframe by using the resources for an individual SR.

In step S108, the mobile station UE determines whether or not the resources for a collision-type SR are set up.

If "yes," the operation proceeds to step S104. If "no," the operation proceeds to step S109.

In step S109, the mobile station UE transmits the SR by using the "RA procedure."

Now, an operation of the multiple mobile stations UE#1/UE#2 to transmit the SR (the collision-type SR) by using the resources for a collision-type SR will be described with reference to FIG. 5.

Figure 5:
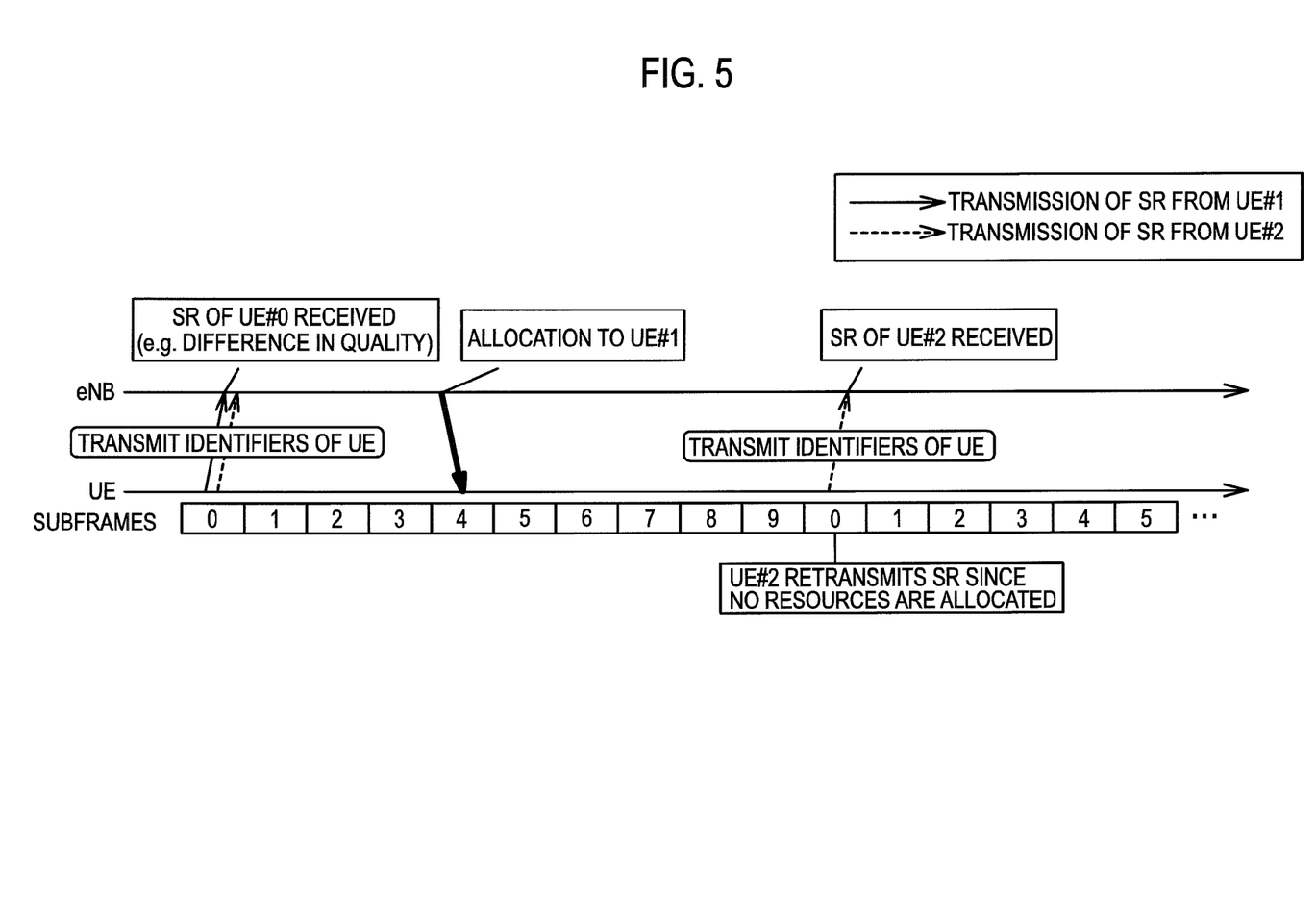
FIG. 5 is a diagram showing the operation of the mobile station according to the first embodiment of the present invention.

As shown in FIG. 5, in the subframe #0, the mobile stations UE#1/UE#2 transmit the SR (the collision SR) respectively including the identifiers of the mobile stations UE#1/UE#2 by using the resources for a collision-type SR.

At this point, the radio base station eNB receives the collision-type SR from the mobile station UE#1, and in the subframe #4, notifies the mobile station UE#1 of resources for an uplink data signal allocated thereto.

On the other hand, no resources for an uplink data signal are allocated to the mobile station UE#2 by the radio base station eNB. Hence, in the next subframe #0, the mobile station UE#2 retransmits the SR (the collision SR) including the identifiers of the mobile stations UE#1/UE#2 by using the resources for a collision-type SR.

At this point, the radio base station eNB receives the collision-type SR from the mobile station UE#2, and in the subframe #4, notifies the mobile station UE#2 of resources for an uplink data signal allocated thereto.

The features of the embodiment may also be expressed as follows.

A first feature of the embodiment is summarized as a mobile station UE including a transmission unit 23 configured, when resources for a collision-type SR (resources for a collision-type scheduling request signal) to be shared with a different mobile station UE are set up, to transmit a collision-type SR (collision-type scheduling request signal) including an identifier of the mobile station UE by using the resources for a collision-type SR. Here, when no resources for an uplink data signal are allocated in response to the collision-type SR, the transmission unit is configured to retransmit the collision-type SR by using the resources for a collision-type SR.

According to the above-described configuration, even when the "always-on" method is applied, it is possible to avoid a situation of a shortage in resources for transmitting an SR while avoiding a delay in transmission of an uplink data signal or a drop in use efficiency of resources, by defining the resources for a collision-type SR.

In the first feature of the embodiment, when the resources for a collision-type SR and resources for an individual SR dedicated for the mobile station UE are both set up, the transmission unit 23 may be configured to transmit a SR signal not including the identifier of the mobile station UE by using the resources for an individual SR.

According to the above-described configuration, the mobile station UE transmits the SR by preferentially using the resources for an individual SR when the resources for an individual SR are set up. Thus, it is possible to avoid occurrence of a collision attributed to simultaneous transmission of the SR by multiple mobile stations UE, and to transmit the uplink data signal faster.

In the first feature of the embodiment, when the resources for a collision-type SR and resources for an individual SR dedicated for the mobile station UE are both set up, the transmission unit 23 may be configured to determine which of the resources for a collision-type SR and the resources for an individual SR are supposed to be used on the basis of a type of an uplink data signal to be transmitted.

According to the above-described configuration, the mobile station UE can change the resources for an SR to be used for transmitting the SR depending on whether the uplink data signal is supposed to be transmitted on a priority basis or the uplink data need not be transmitted on a priority basis, while taking into account both a delay in transmission of the uplink data signal and the use efficiency of the resources.

In the first feature of the embodiment, the mobile station UE may include a control unit 22 configured not to release the resources for a collision-type SR even if "TA timer" (predetermined timer) is expired or if the number of times of retransmission (number of times of transmission) of the collision-type SR exceeds a maximum number of retransmissions.

Meanwhile, when the number of retransmission (the number of transmission) of the collision-type SR reaches a predetermined number of times of retransmission, the transmission unit 23 may stop the retransmission of the collision-type SR, or may be configured to notify an upper layer (such as the RRC layer) of that event.

In the first feature of the embodiment, when the resources for a collision-type SR signal and resources for an individual SR dedicated for the mobile station UE are both set up, the control unit 22 may be configured to release the resources for an individual SR if the "TA timer" is expired or if the number of times of retransmission (number of times of transmission) of the collision-type SR exceeds the maximum number of retransmissions.

A second feature of the embodiment is summarized as a radio base station eNB including a transmission unit 12 configured to notify each of a plurality of mobile stations UE#1/UE#2, which are subjected to grouping, of resources for a collision-type SR to be shared by the plurality of mobile stations UE#1/UE#2.

In the second feature of the embodiment, the radio base station eNB may include a control unit 11 configured to perform the grouping on the basis of radio quality factors of the plurality of the mobile stations UE#1/UE#2 in an uplink.

According to the above-described configuration, the same resources for a collision-type SR are shared by the mobile stations UE having equivalent radio quality factors in the uplink. Thus, it is possible to equalize possibilities for the collision-type SR transmitted from the mobile stations UE to be received by the radio base station eNB.

In the second feature of the embodiment, the radio base station eNB may includes a control unit 11 configured to perform the grouping on the basis of whether or not each of the plurality of mobile stations UE#1/UE#2 is a priority terminal.

According to the above-described configuration, by increasing the resources for a collision-type SR shared by the group to which a mobile station UE being a priority terminal is assigned, it is possible to increase a possibility for the collision-type SR transmitted from the priority terminal to be received by the radio base station eNB.

In the second feature of the embodiment, the radio base station eNB may include a control unit 11 configured to perform the grouping on the basis of terminal types of the plurality of mobile stations UE#1/UE#2.

In the second feature of the embodiment, the identifier of the mobile station UE may be specified by information retained by the mobile station UE.

For example, the radio base station eNB may share a configuration concerning the SR (such as the number of times of transmission of the SR) among the grouped mobile stations UE.

In the second feature of the embodiment, the transmission unit 12 may be configured to notify of a maximum number of retransmissions of an individual scheduling request signal dedicated for the mobile station UE aside from a maximum number of retransmissions of the collision-type scheduling request signal.

In the second feature of the embodiment, the transmission unit 12 may be configured to indicate an identifier to be included in the collision-type scheduling request signal and to be transmitted by the mobile station UE.

It should be noted that the foregoing operations of the mobile station UE and the radio base station eNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base station eNB. Otherwise, the storage medium and the processor may be provided as discrete components inside the mobile station UE and the radio base station eNB.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-169922 (filed on Jul. 31, 2012) is incorporated by reference in the present specification.

INDUSTRIAL APPLICABILITY

As described above, according to the present invention, it is possible to provide a mobile station and a radio base station, which are capable of avoiding a situation of a shortage in resources for transmitting an SR while avoiding a delay in transmission of an uplink data signal or a drop in use efficiency of resources when the "always-on" method is applied.

EXPLANATION OF THE REFERENCE NUMERALS

| | |
|---|---|
| eNB | radio base station |
| UE | mobile station |
| 11, 22 | control unit |
| 12, 23 | transmission unit |
| 13, 21 | reception unit |

The invention claimed is:

1. A mobile station comprising:
a transmission unit configured when resources for a collision-type scheduling request signal to be shared with a different mobile station are set up, to transmit the collision-type scheduling request signal including an identifier of the mobile station by using the resources for the collision-type scheduling request signal, wherein
when no resources for an uplink data signal are allocated in response to the collision-type scheduling request signal, the transmission unit is configured to retransmit the collision-type scheduling request signal by using the resources for the collision-type scheduling request signal, and
when the resources for the collision-type scheduling request signal and resources for an individual scheduling request signal dedicated for the mobile station are both set up, the transmission unit is configured to transmit a scheduling request signal not including the identifier of the mobile station by using the resources for an individual scheduling request signal.

2. The mobile station according to claim 1, wherein
when the number of times of transmission of the collision-type scheduling request signal reaches a predetermined number of times of transmission, the transmission unit is configured to stop retransmission of the collision-type scheduling request signal.

3. A mobile station comprising:
a transmission unit configured, when resources for a collision-type scheduling request signal to be shared with a different mobile station are set up, to transmit the collision-type scheduling request signal including an identifier of the mobile station by using the resources for the collision-type scheduling request signal, wherein
when no resources for an uplink data signal are allocated in response to the collision-type scheduling request signal, the transmission unit is configured to retransmit the collision-type scheduling request signal by using the resources for the collision-type scheduling request signal, and
when the resources for the collision-type scheduling request signal and resources for an individual scheduling request signal dedicated for the mobile station are both set up, the transmission unit is configured to determine which of the resources for the collision-type scheduling request signal and the resources for an individual scheduling request signal are supposed to be used on the basis of a type of an uplink data signal to be transmitted.

4. The mobile station according to claim 2, wherein when the number of times of transmission of the collision-type scheduling request signal reaches a predetermined number of times of transmission, the transmission unit is configured to stop retransmission of the collision-type scheduling request signal.

5. A mobile station comprising:
a transmission unit configured, when resources for a collision-type scheduling request signal to be shared with a different mobile station are set up, to transmit the collision-type scheduling request signal including an identifier of the mobile station by using the resources for the collision-type scheduling request signal, wherein
when no resources for an uplink data signal are allocated in response to the collision-type scheduling request signal, the transmission unit is configured to retransmit the collision-type scheduling request signal by using the resources for the collision-type scheduling request signal; and
a control unit configured not to release the resources for the collision-type scheduling request signal even if a predetermined timer is expired or if the number of times of retransmission of the collision-type scheduling request signal exceeds a maximum number of retransmissions, wherein
when the resources for the collision-type scheduling request signal and resources for an individual scheduling request signal dedicated for the mobile station are both set up, the control unit is configured to release the resources for the individual scheduling request signal if the predetermined timer is expired or if the number of times of retransmission of the collision-type scheduling request signal exceeds the maximum number of retransmissions.

6. The mobile station according to claim 5, wherein when the number of times of transmission of the collision-type scheduling request signal reaches a predetermined number of times of transmission, the transmission unit is configured to stop retransmission of the collision-type scheduling request signal.

* * * * *